US009826397B2

(12) United States Patent
Zhou et al.

(10) Patent No.: US 9,826,397 B2
(45) Date of Patent: *Nov. 21, 2017

(54) SYSTEM AND METHOD FOR TRANSFERRING WIRELESS NETWORK ACCESS PASSWORDS

(71) Applicant: Intel Corporation, Santa Clara, CA (US)

(72) Inventors: Yong Zhou, San Jose, CA (US); Prasanna J. Satarasinghe, McKinney, TX (US); David Ka-Wai Hui, Fremont, CA (US); Vladimir Alperovich, Dallas, TX (US); James Goss, Grapevine, TX (US); John Baker, Southlake, TX (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,312

(22) Filed: Oct. 8, 2014

(65) Prior Publication Data

US 2015/0094027 A1  Apr. 2, 2015

Related U.S. Application Data (63) Continuation of application No. 13/117,378, filed on May 27, 2011, now Pat. No. 8,885,555, which is a (Continued)

(51) Int. Cl.
*H04W 4/00* (2009.01)
*H04W 12/04* (2009.01)
(Continued)

(52) U.S. Cl.
CPC ......... *H04W 12/04* (2013.01); *H04L 63/0838* (2013.01); *H04L 63/18* (2013.01);
(Continued)

(58) Field of Classification Search
CPC .... H04L 63/18; H04L 63/0838; H04W 12/06; H04W 12/04
(Continued)

(56) References Cited

U.S. PATENT DOCUMENTS

| 5,104,803 A | 4/1992 | Delente |
| 5,608,780 A | 3/1997 | Gerszberg |

(Continued)

FOREIGN PATENT DOCUMENTS

EP    1081895    3/2001

OTHER PUBLICATIONS

Cisco Systems, Inc., "GPRS White Paper," 2000, pp. 1-19.
(Continued)

*Primary Examiner* — Sai-Ming Chan
(74) *Attorney, Agent, or Firm* — Pillsbury Winthrop Shaw Pittman LLP (57) ABSTRACT

The present disclosure provides an access node for transferring and/or assigning network passwords. The access node includes a first interface for sending and receiving communication of a first type to and from a first node operating in a wireless local area network (WLAN). The access node also includes a second interface for sending and receiving communication of a second type to and from a second node in a mobile network, such as a GSM/GPRS network. The access node further includes a short messaging service (SMS) module for sending and receiving. SMS messages to the second node carrying an OTP allocated. The access node also includes a mechanism to verify a precondition before the OTP is sent to the second node.

24 Claims, 4 Drawing Sheets

Related U.S. Application Data continuation of application No. 12/359,543, filed on Jan. 26, 2009, now Pat. No. 7,969,934, which is a continuation of application No. 10/434,695, filed on May 9, 2003, now Pat. No. 7,489,918.

(51) Int. Cl.

| | | |
|---|---|---|
| *H04L 29/06* | (2006.01) | |
| *H04W 12/06* | (2009.01) | |
| *H04W 4/12* | (2009.01) | |
| *H04W 12/08* | (2009.01) | |
| *H04W 84/12* | (2009.01) | |
| *H04W 4/20* | (2009.01) | |
| *H04W 84/04* | (2009.01) | |
| *H04W 84/18* | (2009.01) | |

(52) U.S. Cl.
CPC ............. *H04W 4/12* (2013.01); *H04W 12/06* (2013.01); *H04W 12/08* (2013.01); *H04W 84/12* (2013.01); *H04W 4/20* (2013.01); *H04W 84/04* (2013.01); *H04W 84/18* (2013.01)

(58) Field of Classification Search
USPC ........................................................ 370/328
See application file for complete search history.

(56) References Cited

U.S. PATENT DOCUMENTS

| | | | |
|---|---|---|---|
| 5,623,534 | A | 4/1997 | Desai |
| 5,828,737 | A | 10/1998 | Sawyer |
| 5,991,292 | A | 11/1999 | Focsaneanu |
| 5,991,639 | A | 11/1999 | Rautiola |
| 5,999,813 | A | 12/1999 | Lu |
| 6,151,628 | A | 11/2000 | Xu |
| 6,212,395 | B1 | 4/2001 | Lu |
| 6,219,346 | B1 | 4/2001 | Maxemchuk |
| 6,333,919 | B2 | 12/2001 | Gaffney |
| 6,415,151 | B1 | 7/2002 | Kreppel |
| 6,418,324 | B1 | 7/2002 | Doviak et al. |
| 6,427,170 | B1 | 7/2002 | Sitaraman |
| 6,473,413 | B1 | 10/2002 | Chiou |
| 6,490,451 | B1 | 12/2002 | Denman et al. |
| 6,496,505 | B2 | 12/2002 | LaPorta |
| 6,512,754 | B2 | 1/2003 | Feder |
| 6,515,989 | B1 | 2/2003 | Ronneke |
| 6,606,310 | B1 | 8/2003 | Vialen et al. |
| 6,636,502 | B1 | 10/2003 | Larger et al. |
| 6,683,881 | B1 | 1/2004 | Mijares et al. |
| 6,687,243 | B1 | 2/2004 | Sayers et al. |
| 6,728,215 | B1 | 4/2004 | Alperovich et al. |
| 6,760,343 | B1 | 7/2004 | Krishnamurthy et al. |
| 6,775,549 | B2 | 8/2004 | Benveniste |
| 6,795,701 | B1 | 9/2004 | Baker et al. |
| 7,079,499 | B1 | 7/2006 | Akhtar et al. |
| 7,756,507 | B2 * | 7/2010 | Morper .................. H04L 12/14 455/405 |
| 2001/0001268 | A1 | 5/2001 | Menon |
| 2001/0043577 | A1 | 11/2001 | Barany |
| 2001/0055298 | A1 | 12/2001 | Baker et al. |
| 2002/0058495 | A1 | 5/2002 | Chow et al. |
| 2002/0089949 | A1 | 7/2002 | Bjelland et al. |
| 2002/0099854 | A1 | 7/2002 | Jorgensen |
| 2002/0101848 | A1 | 8/2002 | Lee |
| 2002/0133457 | A1 | 9/2002 | Gerlach et al. |
| 2002/0159420 | A1 | 10/2002 | Naqvi et al. |
| 2002/0184391 | A1 | 12/2002 | Phillips |
| 2003/0007625 | A1 | 1/2003 | Pines et al. |
| 2003/0051041 | A1 | 3/2003 | Kalavade et al. |
| 2003/0053444 | A1 | 3/2003 | Swartz |
| 2003/0076808 | A1 | 4/2003 | McNiff et al. |
| 2003/0095527 | A1 | 5/2003 | Shanbhag |
| 2003/0117948 | A1 | 6/2003 | Ton et al. |
| 2003/0117983 | A1 | 6/2003 | Ton et al. |
| 2003/0196105 | A1 | 10/2003 | Fineberg |
| 2004/0215957 | A1 * | 10/2004 | Moineau ............ H04L 63/0227 713/153 |
| 2005/0013264 | A1 | 1/2005 | Sundberg |
| 2005/0124288 | A1 | 6/2005 | Karmi |
| 2006/0030304 | A1 | 2/2006 | Sofer et al. |

OTHER PUBLICATIONS

PicoNode—A Compact GSM Network Family for Community and Rural Coverage,: Nortel Networks brochure, 1999, 4 pages.
PicoNode—A Compact GSM Network Family for Unparalleled Corporate Solutions, Nortel Networks brochure, 1999, 4 pages.

* cited by examiner

SYSTEM AND METHOD FOR TRANSFERRING WIRELESS NETWORK ACCESS PASSWORDS

CROSS-REFERENCE RELATED APPLICATIONS

The current application is a continuation of U.S. patent application Ser. No. 13/117,378, filed on May 27, 2011, which is a continuation of U.S. patent application Ser. No. 12/359,543, filed on Jan. 26, 2009, now U.S. Pat. No. 7,969,934, which is a continuation of U.S. patent application Ser. No. 10/434,695, filed on May 9, 2003, now U.S. Pat. No. 7,489,918, the entire contents of all of which are incorporated herein by reference. This application relates to U.S. Ser. No. 09/851,681, filed on May 8, 2001, U.S. Ser. No. 10/277,759, filed on Oct. 22, 2002, U.S. Ser. No. 10/302,137, filed on Nov. 22, 2002, and U.S. Ser. No. 10/302,589, filed on Nov. 22, 2002, all of which are commonly assigned and incorporated herein by reference in their entirety.

BACKGROUND

The present invention relates generally to a communications system and, more particularly, to a system and method for transferring and/or assigning network passwords through short messages.

Wireless local area network (WLAN) has emerged as a mainstream technology to support high-speed wireless data transfer in a local coverage area. For example, a version of WLAN commonly known as IEEE 802.11 has been increasing in popularity. The 802.11 based WLAN has rapidly gained acceptance in public hotspots, enterprises and homes. Other types of WLANs currently exist and will likely continue to emerge.

Access to WLANs must often be controlled and/or authenticated to ensure that only certain entities can connect to the network. One common way of controlling and/or authenticating access to a network is through the use of a password and/or access code, hereinafter generically "password." Passwords can be entity specific, such as a single user, or can be available for a group of entities such as a group of users in a common workplace.

What is needed, is a system and method that system and method for assigning and/or providing passwords to one or more entities to allow then to access a wireless network.

SUMMARY

The present disclosure provides a system and method for transferring and/or assigning network passwords. In one embodiment, a new and unique access node is provided. The access node includes a first interface for sending and receiving communication of a first type to and from a first node operating in a wireless local area network (WLAN). The access node also includes a second interface for sending and receiving communication of a second type to and from a second node in a mobile network, such as a GSM/GPRS network. The access node further includes a short messaging service (SMS) module for sending and receiving SMS messages to the second node.

In another embodiment, a new and unique method for providing a one-time password (OTP) to allow access to a WLAN is provided. The method includes sending a first SMS message to a mobile unit operating in a wireless network, the first SMS message including an identifier for an access node serving the WLAN. The method also includes receiving a second SMS message from the mobile unit into the access node, the second SMS message indicating a desire to access the WLAN. A third SMS message is then sent to the mobile unit including the OTP. As a result, the WLAN can be accessed using the OTP.

In another embodiment, a new and unique method for providing a one-time password (OTP) to a WLAN client is provided. The method includes sending a first SMS message to a mobile unit operating in a wireless network, the first SMS message including an identifier for an access node serving the WLAN. The method also includes receiving a second SMS message from the mobile unit into the access node and checking for a predetermined condition associated with either the mobile unit or the wireless network. If the predetermined condition is met, the OTP is provided to the mobile unit and used to access a WLAN service from the WLAN client.

In some embodiments, the predetermined condition is periodically checked while the WLAN service is being provided to the WLAN client.

In another embodiment, a new and unique method for providing access to a WLAN is disclosed. The method includes sending a first message to a mobile station operating in a wireless network, the first message including an identifier for an access node serving the WLAN. A second message is received from the mobile station and sent to an access node via the wireless network so that the access node can provide an access code for accessing the WLAN. The access code is received from the access node in a third message sent to the mobile station so that the WLAN can be accessed using the access code.

In another embodiment, a new and unique method for providing a password to an internet device for using a WLAN is provided. The method includes receiving an SMS message from a mobile station operating in a wireless network into an access controller serving the WLAN. A predetermined condition associated with the mobile station is checked, and if it is met, the password is provided to the mobile station. An access request is received from the internet node, the access request including the password, and the internet device is allowed to connect to an internet node.

In another embodiment, a new and improved wireless server is provided. The wireless server includes a first module for performing SGSN functionality and including a Gd interface connected to an SMS node in a GSM/GPRS network. The wireless server also includes a second module for performing WLAN functions on a WLAN and a third module for providing Internet access to a WLAN device connected to the WLAN. The wireless server also includes means for transferring, through the Gd interface, a One-Time Password (OTP) to a mobile unit connected to a wireless network, receiving the OTP from the WLAN device for authentication, and connecting the WLAN device to the Internet upon receipt of the OTP.

Many advantages of the present invention will become apparent to one skilled in the art from the subsequent description and the appended claims taken in conjunction with the accompanying drawings.

DETAILED DESCRIPTION

The present invention can be described by the embodiments given below. It is understood, however, that the embodiments below are not intended to be limitations to the present invention, but are used to describe examples for implementing the invention.

Figure 1:
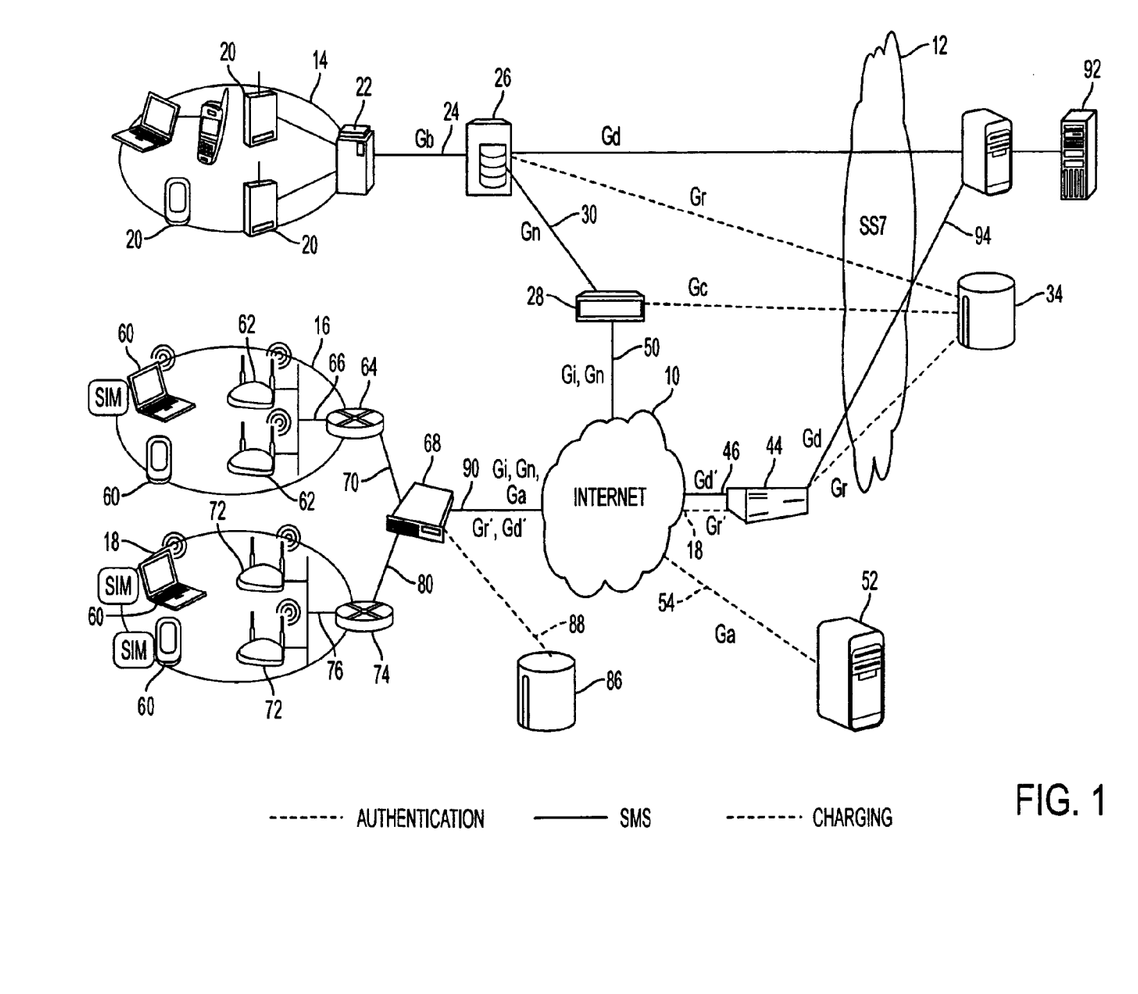
FIG. 1 illustrates an example network that can benefit from different embodiments of the present invention.

Referring now to FIG. 1, five different networks are shown—a first network 10 such as the Internet, a second network 12 such as the public Signaling System 7 (SS7) network, a third network 14 such as a mobile (or cellular) network, and two wireless local area networks (WLANs) 16, 18. For the sake of example, specific nodes in or between the five networks will be further discussed, it being understood that different nodes will be used for different types of networks. For example, a global system mobile (GSM) network and a code division multiple access (CDMA) network are both suitable examples of the network 14, but only the GSM network example will be continued in the present disclosure to avoid confusion. In furtherance of the example, packet-switched data signals and message names will be described using general packet radio service (GPRS) format. For example, short message service (SMS) is used as a data transfer mechanism for implementing different embodiments of the present invention. Also, links in the GSM/GPRS network 14 commonly use Gb, Gr, Gc, Gd, Gs, Gn, Gp, and Gi type interfaces for carrying different combinations of signaling information and data, although other types of interfaces can also or alternatively be used.

The GSM/GPRS network 14 includes a plurality of mobile stations 20, which are illustrated in the present example as a cellular telephone and a computer connected to a cellular telephone. Other examples include personal digital assistants, pagers, wired telephones, and other types of communication devices being used in the network 14. The mobile stations 20 are connected to one or more base station transceivers (BTSs) and controllers (BSCs) 22 through a wireless link. A link is a generic term to describe a mechanism for sharing information between two nodes. The BSCs 22 are connected through a link 24 to a Serving GPRS Support Note (SGSN) 26. It is understood that the reference to links and nodes is simplified, and that many intermediate nodes and links are likely to exist between those illustrated.

The SGSN 26 is connected to an SMS Interworking Mobile Switching Center (MSC)/Gateway MSC (SMS-IWMSC/SMS-GMSC) 28 through a link 30 which is part of the SS7 network 12. The SMS-IWMSC/SMS-GMSC 28 is further connected to an SMSC 32. The SGSN 26 is also connected to a home location register (HLR) 34 through a link 36 and a Gateway GPRS Support Node (GGSN) 38 through a link 40. The GGSN 38 is also connected to the HLR 34 through a link 42. An access node 68, discussed in greater detail below, is connected to the HLR 34 and the SMS-IWMSC/SMS-GMSC 28 via a signaling gateway 44.

The signaling gateway 44 is connected to the Internet 10 through links 46 and 48, and the GGSN 38 is connected to the Internet through a link 50. In addition, a charging gateway/billing system 52 is connected to the Internet 10 through a link 54.

The first and second WLANs 16, 18 include a plurality of WLAN clients 60, which are illustrated in the present example as a personal digital assistant and a mobile computer. The WLAN clients 60 in the first WLAN 16 can be connected to an access point (AP) 62 through a wireless link. The AP 62 is connected to a router 64 through a link 66, which is further connected to an access node 68 through a link 70. The WLAN clients 60 in the second WLAN 18 can be connected to an AP 72 through a wireless link. The AP 72 is connected to a router 74 through a link 76, which is further connected to the access node 68 through a link 80.

The WLAN clients 60 include appropriate client hardware and software for interfacing with the access node 68, including a WLAN Network Interface Card (NIC). Also, one or more of the WLAN clients include a subscriber interface module, or SIM card. A SIM card is traditionally inserted into GSM-enabled telephones and includes telephone account information. For other embodiments, including non-GSM embodiments, the SIM card represents any hardware and/or software module that provides account and security information for using a subscribed network.

The access node 68 is connected to an Authentication, Authorization, and Accounting (AAA) server 86 through a link 88 and is also connected to the Internet 10 through a link 90. Furthermore, a charging gateway/billing system 92 is connected to the Internet 10 through a link 94.

In the present example, the access node 68 is derived from and shares much of the functionality of a WAIN server as provided by Transat Technologies of Southlake, Texas. The WAIN server is described in presently incorporated U.S. application Ser. No. 09/851,681. Additions and modifications to the WAIN server are discussed in greater detail below. It is understood, however, that the present invention is not limited for use on a WAIN server, but can be used on different servers produced by different manufacturers.

The access node 68 seamlessly integrates the WLANs 16, 18 with the GSM/GPRS mobile network 14 based on the GSM/GPRS authentication and a charging mechanism using a SIM card. In addition to WLAN control functions, the access node 68 acts as a GPRS support node presenting standard GPRS link interfaces to communicate with other GPRS nodes. One of the interfaces is the Gd between the access node 68 and the SMS-IWMSC/SMS-GMSC for SMS transfer. Since the access node 68 has signaling links to the HLR 34 and the SMS-IWMSC/SMS-GMSC 28, the function of transmitting the OTP through SMS can be integrated.

The access node 68 is often installed in hotspots or an insecure environment. In order for the access node 68 to be a "trusted entity" of the mobile network 14, a mechanism for validating the access node by the mobile network is provided. The present disclosure describes a method that the access node 68 can operate as a standard GSM/GPRS mobile so that the access node itself can be authenticated by an authentication node of the mobile network 14. This would prevent an unauthorized operation by the access node 68 software.

The access node 68 acts as a combined SMS-mobile and SGSN. The access node 68 can receive an SMS message from a mobile carrying its MSISDN and send an SMS message to the mobile carrying an assigned OTP for the WLAN access. With this SMS translation function in the access node 68, a client of the access node can send and receive SMS messages through a simple interface.

In some embodiments, the access node 68 is capable of integrating the WLANs 16, 18 into the GSM/GPRS mobile network 14. In addition to the conventional control requirements for the WLANs 16, 18, the access node 68 acts as a combined SGSN and GGSN (Gateway GPRS Support Node) providing standard GPRS interfaces to the GPRS core network. These interfaces include Gi to the Internet 10 for IP data interworking, Gr to the HLR/AuC (Authentication Center) 34 for authentication and subscription data downloading, Ga to a Charging Gateway (CG) 92 for charging data transferring, Gn to an external GGSN (or SGSN) 38 for roaming and mobility handling, and Gd to an SMS-IWMSC/SMS-GMSC 28 for SMS transfer. The access node 68 can support GPRS authentication, session management and mobility handling for one or more of the WLAN clients 60. In the present embodiment, all internet protocol (IP) interfaces are designed around the access node 68. For communicating with the SS7 network 12, the Signaling Gateway 44 converts the IP based protocols to the SS7 based protocols. In other embodiments, the access node 68 can include the functionality of the signaling gateway 44.

If the WLAN client 60 includes a SIM card, it can authenticate itself using conventional GSM/GPRS authentication procedures. The WLAN client 60 (acting as a "client") will be identified and verified through its International Mobile Subscriber Identity (IMSI) and the security information stored on the SIM card. The access node 68 acts as a SGSN in the authentication procedure. Charging data will be generated in a standard ASN.1 format and transferred to a Charging Gateway of the mobile network 14.

For non-SIM WLAN clients 60, a User ID/Password can be provided via SMS to a different mobile station (e.g., mobile station 20) that is SIM-enabled or is otherwise configured for SMS. The information can then be used to authenticate the non-SIM WLAN client. In this scenario, the access node 68 acts as a RADIUS Client forwarding the User ID/Password and accounting information to the AAA server 86. It is understood that the RADIUS protocol is only one example of a suitable protocol, and other protocols can be used.

In the present example, the GSM/GPRS mobile network 14 intends to offer WLAN access to WLAN clients 60 in the WLAN networks 16, 18. The mobile network 14 may broadcast a SMS message to mobile stations attached to its network. The message announces the WLAN access via an OTP offering, which may include a prompt for a mobile phone number via a web interface and/or an SMS message to a designated access node to obtain an OTP for accessing the WLAN. The WLAN service accessed via the assigned OTP can thereby be charged to a mobile phone account.

Alternatively, the mobile network 14 can elect to offer the one-time WLAN access free of charge under a predetermined condition, such as long as the mobile station 20 stays attached to the operator's mobile network 14. Other conditions include a type of service subscribed by the mobile station 20, time, or date. It is understood that reference to the mobile station 20 refers to a mobile unit in the mobile network 14, while reference to the WLAN client 60 refers to a wireless unit in the WLANs 16, 18. In some embodiments, a mobile station 20 and a WLAN client 60 can be the very same mobile unit, or portions of the same mobile unit, operating (or capable of operating) in either or both networks.

Figure 2:
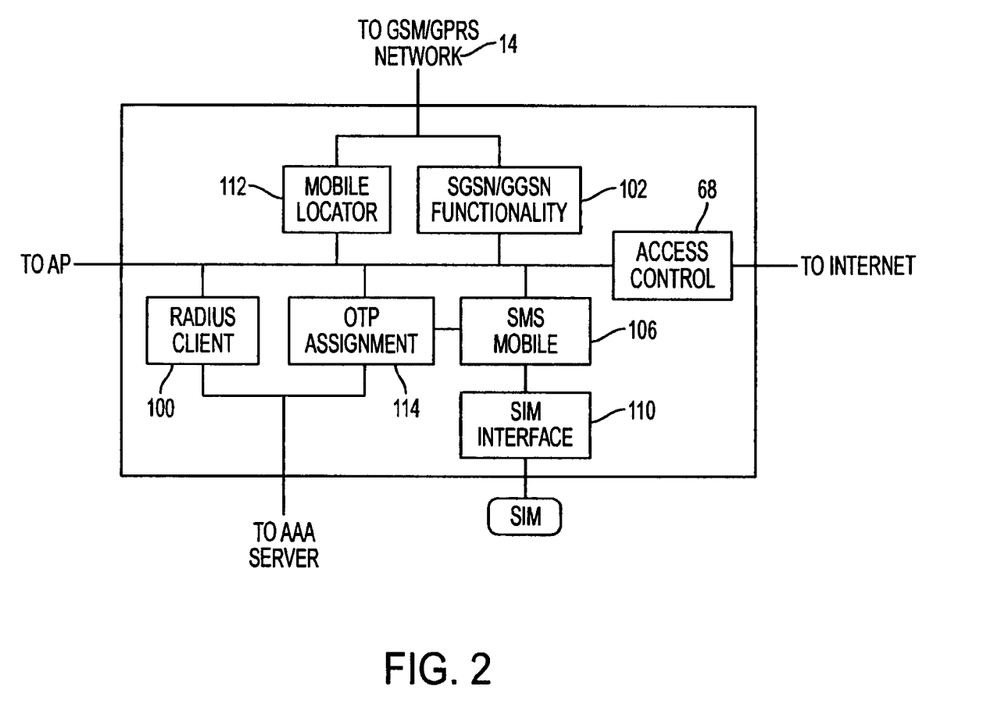
FIG. 2 is a block diagram of an access node for implementing one or more different embodiments of the present invention.
Figure 3:
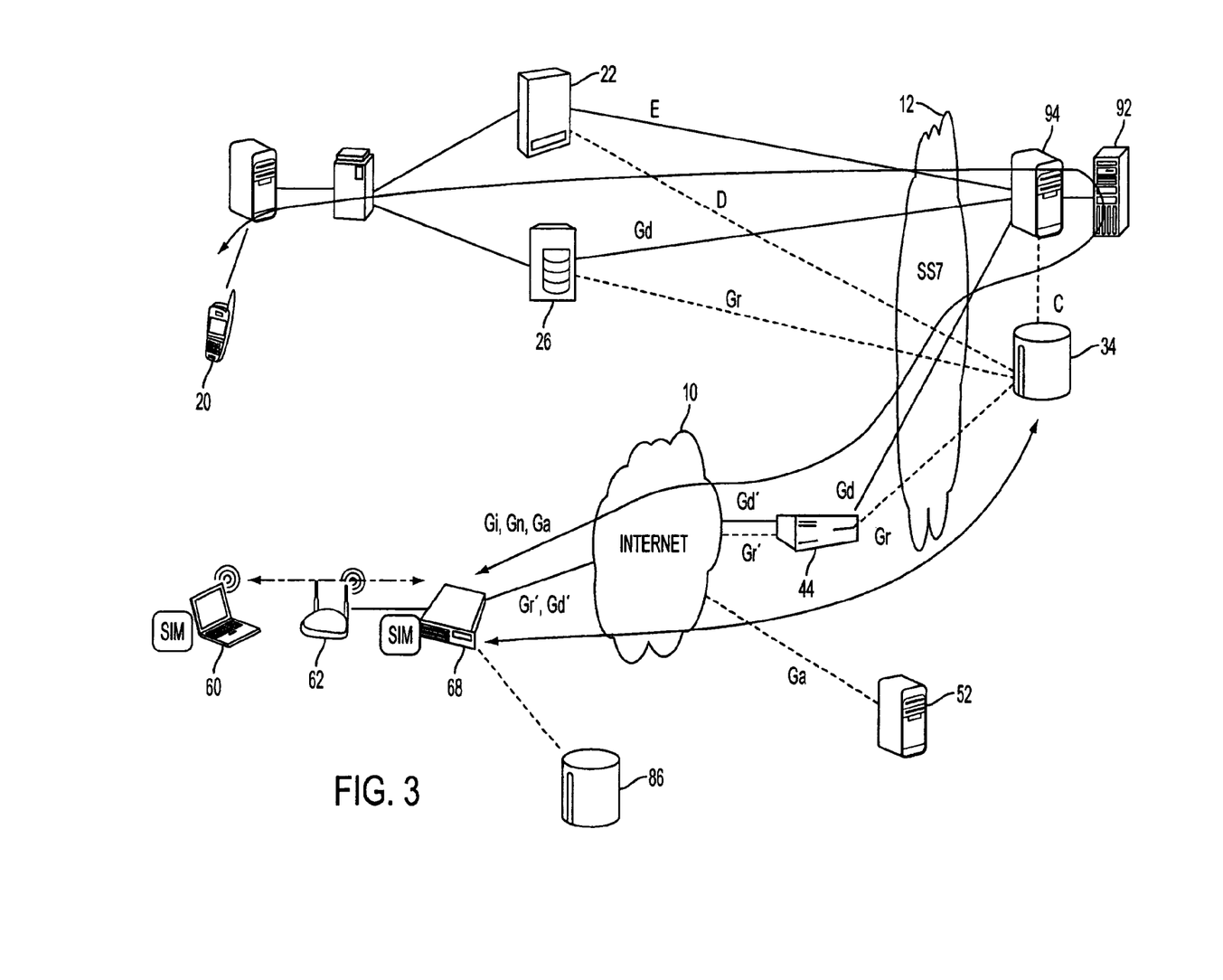
FIG. 3 is a simplified diagram of a network showing the flow of SMS messages between the access node of FIG. 2 and a mobile station.

Referring also to FIG. 2, if the mobile network 14 is going to offer services based on predetermined criteria associated with the mobile station 20, the access controller 68 must be able to verify that the criteria has been satisfied. Continuing with the example that the mobile network 14 offers free WLAN access when the mobile station 20 is attached to the mobile network, the access controller 68 must be able to determine if the mobile station is in the mobile network 14. In the present embodiment, the access node 68 has a RADIUS client module 100 for authentication capability, a SGSN/GGSN functionality module 102 for connecting to the mobile network 14, and an IP interface 104 for connecting to the Internet 10. In addition, the access node 68 includes an SMS mobile module 106 for allowing the access node to appear as a subscriber to the mobile network 14, a SIM interface module 108 for receiving a SIM card 110, a mobile locator module 112 for performing the actions necessary for the predetermined criteria (the mobile station 20 is attached to the wireless network 14, in the present example), and an OTP assignment module 114 for creating the OTP. These modules may be provided by one or more electric circuit cards located on the access node 68, a software modification/addition of an existing access node, or a combination thereof. For example, the electric cards may include processors, memory, bus interface devices, buffers, and appropriate software, based on choice of design by one of ordinary skill in the art. The modules are clearly defined by their operation, discussed in greater detail below. It is understood that not all of the above-mentioned modules are required in every embodiment, and some modules will inherently be different to accommodate different network and signaling requirements.

In the present embodiment, the access node 68 can act, at least in part, as a mobile station to the mobile network 14. In the present example, the access node 68 will obtain a GSM/GPRS subscription and the corresponding SIM card 110 from an operator of the mobile network 14. In some embodiments, the access node 68 will obtain multiple SIM cards for use with one or more mobile networks. As part of the subscription, an MSISDN will be assigned to the access node 68 in addition to an IMSI. In furtherance of the present example, the service profile will include at least SMS-MO and SMS-MT services. Before the access node 68 can send or receive SMS, an attach request procedure is initiated from the SMS mobile module 106 of the access node 68, and a GSM/GPRS authentication procedure can then be carried out with an appropriate HLR/AuC (e.g., the HLR 34 of FIG. 1) through the SGSN/GGSN functionality module 102. The GSN/GGSN functionality module 102 includes the necessary hardware and/or software to perform the steps required by the mobile network 14 for performing the present operations.

In the present example, the access node 68 needs to interrogate the HLR 34 for the current location area of the mobile station 20 with the associated MSISDN number. This is done through a MAP (Mobile Application Part) message "sendRoutingInfoForShortMsg" including the mobile station's MSISDN number, the same one used by the SMS GMSC 28 to interrogate the HLR 34 via the C interface to retrieve routing information necessary to forward the short message. The HLR 34 will return an MSC or SGSN address, or both addresses, identifying the mobile station's location area if the mobile station 20 is attached. If the mobile station 20 is not attached, the HLR 34 will return error information. It is understood that the mobile station 20 may have attached through an MSC or an SGSN that does not belong to the mobile network 14. Using the mobile locator module 112, the access node 68 can compare the received MSC/SGSN address(es) with a pre-stored list to determine whether the mobile station 20 is currently attached to the mobile network 14.

If the mobile station 20 is attached to the mobile network 14, the OTP assignment module 114 will assign an OTP associated with the MSISDN and will form an SMS-MO message including the OTP for the mobile station 20 identified by the MSISDN. The SMS-MO message is sent to the mobile network's SMS-IWMSC 28 via the Gd interface on the link 48, and then to the associated SMSC 32. The SMSC 32 then forwards the SMS information in an SMS-MT message to the mobile station 20 attached in the mobile network 14 and identified by the MSISDN. If the mobile network 14 is a GSM network but hot GPRS enabled, the SMS transmission to/from the SMS-IWMSC/SMS-GMSC 28 can be through an E interface. In this case, the access node 68 and the Signaling Gateway 44 emulate an MSC/VLR for communicating with the SMS-IWMSC/SMS-GMSC 28.

At the same time, the access node 68 can send the assigned OTP to the AAA server 86 for subsequent RADIUS authentication for WLAN access. It is understood that the mobile station 20 may be in a WLAN area served by another access node, instead of the designated access node 68. The RADIUS authentication requests from multiple access nodes can be sent to the AAA Server 86. In some embodiments, the AAA Server 86 can be combined into the designated access node 68.

If the WLAN client 60 provides its mobile number on a web page prompted by a serving access node other than the designated access node 68 (the one to which the mobile station 20 sends an SMS), the serving access node can carry the same procedure, i.e. checking the mobile location, assigning and sending an OTP to the WLAN client 60 and the AAA server 86.

In the present example, the one-time WLAN access can be charged based on SMS-MO CDRs (Call Detail Record) and SMS-MT CDRs generated by the access node 68 and the MSC 152 or SGSN 26 in the mobile network 14 for the OTP transfer. If the mobile network 14 decides to offer the one-time WLAN access for a defined duration (e.g. 30 minutes), the duration information can be stored in the AAA Server 86 associated with the OTP account. If the mobile network 14 operator would like the mobile station 20 to stay attached to the mobile network 14 during the free WLAN service period, the access node 68 can periodically interrogate the HLR 34 for the location (and attachment status) of the mobile station 20.

Transmitting and receiving an SMS message on a WLAN client 60 terminal can be performed by an SMS translation function of the access node 68. The WLAN client 60 does not have to have the standard SMS mobile functionality and protocol stack. Instead, the SMS mobile functionality at the access node 68 would terminate and decode the incoming SMS-MT message and send the message content via a secure interface to the SIM enabled WLAN client 60. When the WLAN client 60 wants to send an SMS-MO message, the message content will be sent to the access node 68 along with its MSISDN and destination phone number. Then the access node 68 forms an SMS-MO message on behalf of the WLAN client 60 and transfers the SMS-MO messages as if it were an SMS mobile itself.

Figure 4:
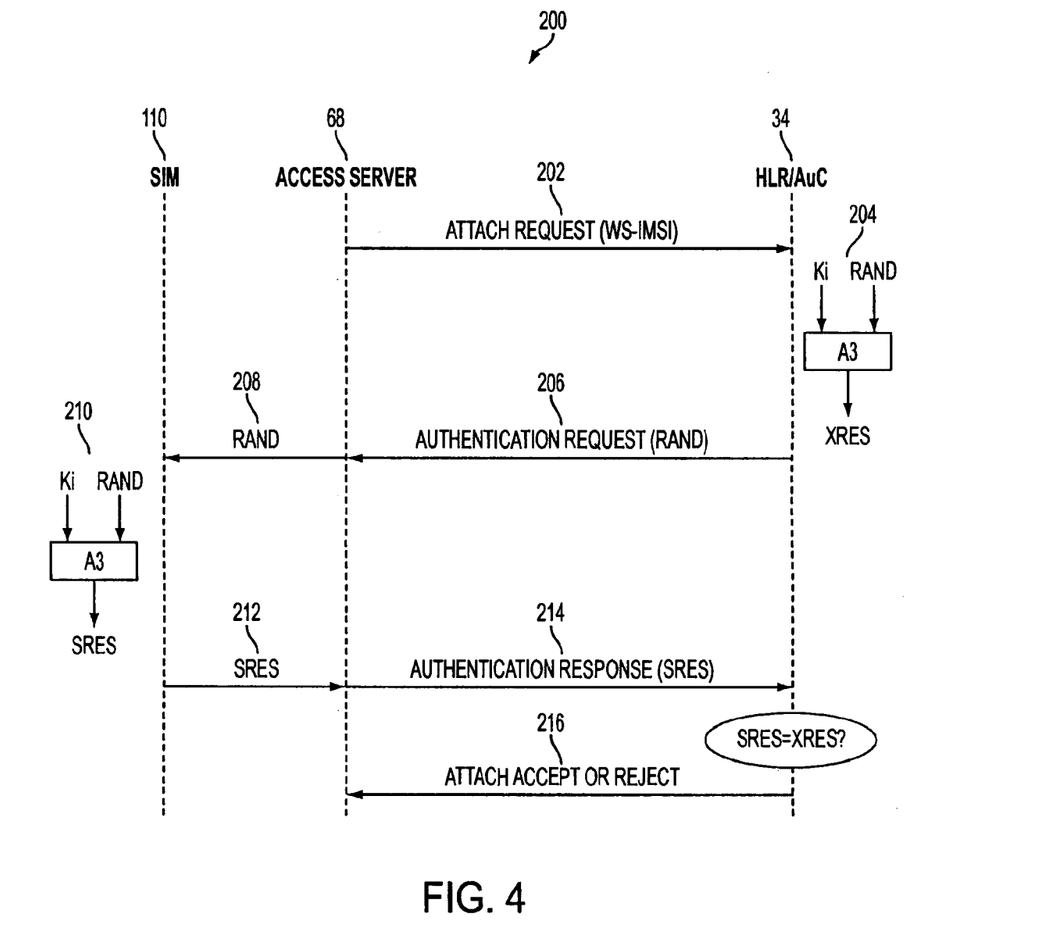
FIG. 4 is a signal flow diagram for authenticating the access node of FIG. 2 for operating in a mobile network.

Referring also to FIG. 4, the access node 68 can perform an authentication procedure 200 to permit the WLAN client 60 to use the WLAN 18. In the present embodiment, the access node 68 includes the SIM card 110 and a pre-subscription with the mobile network 14 (evidence of which may be stored in the HLR 34) allowing the access node to operate as a mobile station in the mobile network for sending/receiving SMS messages. In this way, the access node 68 can be authenticated by the mobile network 14 for security reason. It is understood that there are additional ways of authenticating the access node as a subscriber to the mobile network, some depending on the type of mobile network and additional authentication mechanisms that perform similarly to a GSM SIM card. Also, a voice and/or data subscription may be utilized. Before the access node 68 authenticates the WLAN client 60, it identifies itself and is authenticated as a "trusted" entity by the mobile network 14.

The authentication procedure 200 begins at step 202, where the access node 68 sends an Attach Request message including its IMSI in a secure link to the HLR/AuC 34 through the Signaling Gateway 44. At step 204, the HLR/AuC 34 finds an authentication key "Ki" associated with the access node's IMSI, selects a random challenge "RAND" and generates an expected response "XRES" using a GSM authentication algorithm "A3" and the authentication key Ki. At step 206, the HLR/AuC 34 sends the RAND in an Authentication Request message to the access node 68. At step 208, the access node provides information from the received Authentication Request message to the SIM card 110.

At step 210, the SIM card 110 calculates a Signature Response "SRES" of the random challenge RAND, using the same authentication algorithm A3 and the same authentication key Ki stored on the SIM card. At step 212, the SIM card 110 sends back the SRES to the access node 68, and at step 214 the access node forwards the SRES to the HLR/AuC 34 in an Authentication Response message.

At step 216, the HLR/AuC 34 compares the received SRES with the generated XRES. If the two match, the access node 68 is validated as a mobile station on the mobile network 14. At step 218, the HLR/AuC 34 sends an Attach Accept message to the access node 68. If at step 216 the SRES and XRES do not match, the HLR/AuC 34 will send an Attach Reject message to the access node 68.

The initial authentication procedure 200 can be combined with other procedures, such as with the mobile authentication for SMS services, since they may use the same SIM card. In this case, as soon as the HLR/AuC 34 has authenticated the access node 68, the SMS-mobile module 106 (FIG. 2) in the access node will become attached to the mobile network 14.

It is understood that several modifications, changes and substitutions are intended in the foregoing disclosure and in some instances some features of the invention will be employed without a corresponding use of other features. Accordingly, it is appropriate that the appended claims be construed, broadly and in a manner consistent with the scope of the invention.

The invention claimed is:

1. A non-transitory computer-readable storage medium that contains instructions, which when executed, cause one or more processors to perform operations comprising:
   sending a first message from a mobile unit to an access node to receive a password to access a wireless local area network (WLAN), wherein the mobile unit is to operate in a mobile network, and the access node has a unique identifier and is to provide access in the WLAN; and
   receiving the password from the access node at the mobile unit to access the WLAN.

2. The storage medium of claim 1, wherein the password is a one-time password (OTP).

3. The storage medium of claim 1, wherein said receiving includes receiving a second message at the mobile unit including the password.

4. The storage medium of claim 3, wherein the one or more processors are further caused to perform receiving a third message at the mobile unit from the access node, the third message including the unique identifier of the access node, wherein said sending is performed responsive to said receiving the third message.

5. The storage medium of claim 4, wherein at least one of the first message, the second message or the third message is a short messaging service (SMS) message.

6. The storage medium of claim 1, wherein the access node is a subscriber of the mobile network and the identifier is an Mobile Station International Subscriber Directory Number (MSISDN) number of the access node.

7. The storage medium of claim 1, wherein the mobile network includes at least one of a global system mobile (GSM) network or a code division multiple access (CDMA) network.

8. A device to operate in a mobile network, the device comprising:
an interface to exchange messages in the mobile network, wherein the interface is to:
send a first message from a mobile unit to an access node to receive a password to access a wireless local area network (WLAN), wherein the mobile unit is to operate in a mobile network, and the access node has a unique identifier and is to provide access in the WLAN; and
receive the password from the access node at the mobile unit to access the WLAN.

9. The device of claim 8, wherein the password is a one-time password (OTP).

10. The device of claim 8, wherein the interface is to receive a second message including the password.

11. The device of claim 10, wherein the interface is to receive a third message at the mobile unit from the access node, the third message including the unique identifier of the access node, wherein the interface is send the first message after receiving the third message.

12. The device of claim 11, wherein at least one of the first message, the second message or the third message is a short messaging service (SMS) message.

13. The device of claim 8, wherein the access node is a subscriber of the mobile network and the identifier is an MSISDN number of the access node.

14. The device of claim 8, wherein the mobile network includes at least one of a global system mobile (GSM) network or a code division multiple access (CDMA) network.

15. The device of claim 8, wherein the interface is to send the second message using the identifier.

16. A method to access a wireless local area network (WLAN), the method comprising:
sending a first message from a mobile unit to an access node to receive a password to access the WLAN, wherein the mobile unit is to operate in a mobile network, and the access node has a unique identifier and is to provide access in the WLAN; and
receiving the password from the access node at the mobile unit to access the WLAN.

17. The method of claim 16, wherein the password is a one-time password (OTP).

18. The method of claim 16, wherein said receiving includes receiving a second message at the mobile unit including the password.

19. The method of claim 18, further comprising receiving a third message at the mobile unit from the access node, the third message including the unique identifier of the access node, wherein said sending is performed responsive to said receiving the third message.

20. The method of claim 19, wherein at least one of the first message, the second message or the third message is a short messaging service (SMS) message.

21. The method of claim 16, wherein the access node is a subscriber of the mobile network and the identifier is an MSISDN number of the access node.

22. The method of claim 16, further comprising gaining access to the WLAN through the mobile unit using the password.

23. The method of claim 16, wherein the mobile network includes at least one of a global system mobile (GSM) network or a code division multiple access (CDMA) network.

24. The method of claim 16, wherein said sending includes sending the first message using the identifier.

* * * * *